United States Patent [19]
Gliemeroth et al.

[11] 3,875,321
[45] Apr. 1, 1975

[54] GLASSY OR CRYSTALLINE MATERIAL FOR PHOTOTROPIC THIN LAYERS

[75] Inventors: Georg Gliemeroth, Mainz-Mombach; Lothar Meckel, Ostrich, both of Germany

[73] Assignee: JENAer Glaswerk Schott & Gen., Mainz, Germany

[22] Filed: Apr. 25, 1973

[21] Appl. No.: 354,628

[52] U.S. Cl............ 428/432, 252/300, 96/90 PC, 106/DIG. 6, 350/160 P, 427/166, 427/167, 428/913
[51] Int. Cl...... B29d 11/00, F21u 9/00, G03c 1/52
[58] Field of Search............ 350/160 P; 106/DIG. 6, 106/47 R, 47 Q; 96/90 PC; 252/300; 117/33.3

[56] References Cited
UNITED STATES PATENTS

| | | | |
|---|---|---|---|
| 3,208,860 | 9/1965 | Armistead et al. | 106/DIG. 6 |
| 3,561,269 | 2/1971 | Seitz | 350/160 P |
| 3,655,256 | 4/1972 | Claytor | 350/160 P |
| 3,734,754 | 5/1973 | Randall et al. | 350/160 P |
| 3,766,080 | 10/1973 | Swinehart et al. | 252/300 |

OTHER PUBLICATIONS

Soviet Journal of Optical Technology, Perveyev et al., Feb., 1972, pp. 117–118.
Mees, Theory of Photographic Process, 1966, Third Ed., pp. 113–116.

*Primary Examiner*—Mary F. Kelley
*Attorney, Agent, or Firm*—Burgess, Dinklage & Sprung

[57] ABSTRACT

Reversible phototropic coatings on substrates such as glass or plastic. The coatings are of the system silver cations, copper cations, and chloride or bromide anions.

13 Claims, 4 Drawing Figures

Mol-%

GLASSY OR CRYSTALLINE MATERIAL FOR PHOTOTROPIC THIN LAYERS

BACKGROUND

The invention concerns a material which, when applied in a thin layer to a translucent support, has phototropic properties.

Phototropic glasses and their properties have been extensively described in numerous patents. A recent summary of the state of the art is available (Gliemeroth and Mader: Angewandte Chemie 9 (1970) 6, 434, International Edition in English). Such glasses contain the phototropic agents uniformly distributed in the form of mostly glassy precipitates (Bach and Gliemeroth: Glastechn. Ber. 44 (1971) 8, 305, or J. Amer. Ceram. Soc. 54 (1971) 10).

In contrast to homogeneously phototropic, inorganic glasses, thin inorganic coatings which can be applied in simple form to a translucent support (hereinafter called the substrate) are not in the prior art so far as is known to the applicants. A suitable phototropic coating material is lacking. The most obvious course, of using a coating of silver halide, does not produce a reversible phototropy, and at best it will result in nothing more than photosensitivity such as is known in photography. The search for suitable inorganic materials for phototropic coatings has thus far led to only two practical approaches.

German Offenlegungsschrift No. 1,596,819 and British Pat. No. 1,111,740 disclose work in which a layer of photosensitive silver halide is applied to a substrate of glass or plastic and is then covered with a translucent acceptor layer. This acceptor layer serves to capture the halogens released upon exposure to light and assures their return to the photosensitive silver halide coating, thus providing for the reversibility of the phototropic process. Without the acceptor layer, the loss of the halogens through diffusion would result in a fatiguing of the phototropy (British Pat. No. 1,111,740, p. 2, 105 sqq). The essential content of the work described in German Offenlegungsschrift No. 1,596,819 and British Pat. No. 1,111,740 is the combination of a coating of silver halide (wholly or partially replaceable by likewise photosensitive mercury halide or thallium halide) with an acceptor substance in the form of a coating which covers the photosensitive coating. Experience has taught that such combination presents difficulties in industrial production, so that a simpler solution must be sought.

Another approach to the production of phototropic coatings has been taken in German Auslegeschrift No. 1,596,764 (U.S. Pat. No. 3,419,370) by doping with silver a layer of a halogen-containing, silver-free starting glass, so that silver halogen compounds are formed in this layer to produce the phototropy. In this case the halogens are locked in and their loss through diffusion is prevented by the surrounding glass matrix (the same as in solide phototropic glasses) so as to assure reversibility without fatigue. The silver doping is performed preferably by ion exchange (for sodium ions in the basic glass). This method, however, has the disadvantage of entailing a doping process and a heat treatment which cannot be performed within the framework of the conventional coating processes.

See also our copending application Ser. No. 304,439, filed Nov. 7, 1972.

THE INVENTION

The object of the present invention, therefore, is a physically homogeneous material which may be applied in simple form to a substrate either of glass or of plastic, and which will then, as a coating on this substrate, have phototropic properties, and which may be applied to the substrate by any desired coating process, such as for example by vapor coating procedures, by sputtering, or by immersion in, for example, organometallic solutions of the material followed by pyrolysis or hydrolysis of the solution.

Another object of the invention is a homogeneous material which, when applied as a coating on a substrate, does not decompose during the coating process, especially a material whose composition does not break down during the vacuum coating process at the temperatures which occur therein.

It has surprisingly been found that thin coatings having particularly good phototropic and technical utilization properties can be achieved if the material, which is applied in a thin coating to a translucent support, consists of copper cations, silver cations and chlorine or bromine anions.

Thus, the invention provides an article comprising a substrate forming a body portion of the article, and a reversible phototropic coating on the substrate. The substrate can be transparent or translucent glass or plastic. The coating comprises a glassy or crystalline composition of the system silver cations — at least one of chlorine and bromine anions — copper cations, the components of the system being in a proportion to provide coating having reversible phototropic properties in the form of an extinction change which takes place upon excitation by actinic light (radiation in the violet and ultraviolet regions) and an extinction reduction which takes place upon termination of the excitation. Thereby the objectives of the invention are attained.

The coatings can be applied by the procedures mentioned above. Preferably a batch silver chloride or bromide and copper chloride or bromide are melted and then cooled to provide a solidified body of fused material. The fused material is then reduced to a fine particle size suitable for deposition by the vacuum vapor procedure.

The valence of copper can be stated with certainty only for the raw materials in the batch. The valence of copper in the coatings is not known. In the raw materials in the batch the valence can be either 1 or 2.

The proportion of the components of the system, referred to a batch of compounds of silver and the anion and of copper and the anion melted to produce a fused material for application as the coating, can be about 5–58, preferably 12–55 mole (i.e. atomic) percent silver cations about 8–85, preferably 30–70 mole percent of the anions, and about 2–60, preferably 2–55 mole percent of copper cations. A preferred composition is a silver-bromine-copper system wherein the bromine is about 15–80 mole percent. Desirably the proportion of the silver-bromine-copper is such that the composition is within the eutectic mixture of the two substance system AgBr—CuBr. Informations given in mole-% do not exclude that in some compositions components can be found in the elementary state. Nevertheless these elementary parts are given by reason of better control in mole-%.

DRAWINGS

Figure 4:
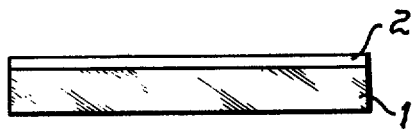

FIG. 4 shows a phototropic article according to the invention. The substrate 1 is coated with a phototropic film 2 of the invention. The substrate can be a glass composition as disclosed in Example 1 below. The articles can be used as lenses of eyeglasses composed of the lenses and frame members including a nose bridge and supports for supporting the eyeglasses by the ears; or panes of windows composed of the pane and a frame therefor.

EXAMPLE 1

To produce a photoropic coating material in an Ag—Cu—Br system, 70.85 wt-% AgBr and 29.15 wt-% CuBr, both of laboratory quality (99%), made by Riedel de Haen of Seelze, are mixed in a mortar and melted in a quartz crucible at 800°C to form a uniform melt which is poured into a steel mold and cooled down to room temperature.

Then the material is crushed in the mortar (less than 0.5 nm grain diameter) and placed in the tungsten crucible of a commercial vapor-vacuum coating system made by Balzers of Frankfurt, Balzers type BA 502 which was used in the other examples herein, as well.

For the production of the phototropic coating, this material is deposited from a vapor at $10^{-5}$ Torr on a commercial substrate glass such as Schott's Tempax glass or mirror glass made by Desag of Gruenenplan.

The vapor coating process is performed in this example with 1 to 1.4 grams of material, the substrate being placed at a distance of about 40 cm from the vapor coating crucible. The vaporization time is 60 seconds, 2 to 5 amperes being applied to the crucible. The voltage was between 3 and 5 volts; 80–100 Amp.

A virtually colorless coating of light gray tint is formed in a thickness of 400 nm on the substrate. When the substrate with its coating is removed from the receiver, the phototropy can be tested with actinic radiation.

In the exposed state, the transmittancy of the substrate glass with coating is 10%; in the unexposed state it amounts to approximately 60%. When the actinic radiation is removed, the exposed substrate chip bearing the coating regenerates to its initial transmittancy. In the exposed state, the color of the coating is blue-black.

EXAMPLES 1-17 AND 23-25

In Table 1 additional examples are listed of suitable compositions of the coating material for coating by the same procedure. In the appended FIG. 1 the compositions are plotted on a ternary diagram for examples 2–17.

TABLE 1

Figure 1:
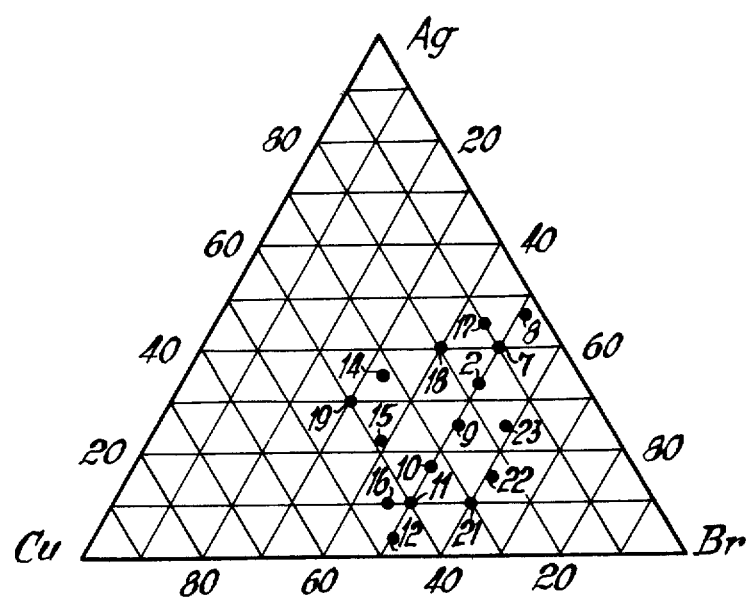
FIG. 1 is a three component composition diagram in mole-%.

| EX. NO. | NO. IN FIG. 1 | MOLE-% Ag | MOLE-% Cu | MOLE-% Br | QUALITY OF PHOTOTROPY |
|---|---|---|---|---|---|
| 2 | 8 | 47.5 | 2.5 | 50.0 | medium |
| 3 | 7 | 40.0 | 10.0 | 50.0 | good |
| 4 | 2 | 32.5 | 17.5 | 50.0 | good |
| 5 | 9 | 25.0 | 25.0 | 50.0 | good |
| 6 | 10 | 17.5 | 32.5 | 50.0 | medium |
| 7 | 11 | 10.0 | 40.0 | 50.0 | poor |
| 8 | 12 | 2.5 | 47.5 | 50.0 | no |
| 9 | 14 | 35.0 | 32.5 | 32.5 | poor |
| 10 | 15 | 22.5 | 38.75 | 38.75 | medium |
| 11 | 16 | 10.0 | 45.0 | 45.0 | poor |
| 12 | 17 | 40.0 | 20.0 | 40.0 | medium |
| 13 | 18 | 35.0 | 30.0 | 35.0 | medium |
| 14 | 19 | 30.0 | 40.0 | 30.0 | slow |
| 15 | 21 | 10.0 | 30.0 | 60.0 | poor |
| 16 | 22 | 15.0 | 23.33 | 61.67 | good |
| 17 | 23 | 25.0 | 16.67 | 53.33 | good |
| 23 | | 5.0 | 30.0 | 65.0 | slow |
| 24 | | 36.16 | 13.84 | 50.0 | good |
| 25 | | 28.68 | 21.32 | 50.0 | good |

EXAMPLE 18

61.68 wt-% AgBr
38.32 wt-% CuBr

Melting conditions: 800°C; 1 min; quartz crucible; electric furnace, bromine atmosphere.

Vaporizing conditions: $10^{-5}$ Torr, 4 A, 0.8 g of substance 40 cm distance, substrate B-270 (sheet glass from Desag, Gruennenplan)

Phototropy of the coating: Initial transmittancy 65% Saturation transmission after 15 min of actinic radiation, 30%; regeneration half-value time: 18 min.

EXAMPLE 19

65.48 wt-% AgBr
34.52 wt-% CuBr

Melting conditions: 800°C; 30 sec; Pt crucible; induction furnace, normal atmosphere.

Vaporizing conditions: $10^{-5}$ Torr; 2 A, 1.0 g of substance, 40 cm distance, Tempax borosilicate glass substrate.

Photoropy of the coating: Initial transmittance 60% Saturation transmission after 15 min of actinic radiation 12%; regeneration half-value time 200 min.

EXAMPLE 20

40.85 wt-% CuCl
59.15 wt-% AgCl

Melting conditions: 720°C; 2 min; quartz crucible, electric furnace, chlorine atmosphere.

Substrate: Polyvinylbutyral

Vaporizing conditions: Same as Example 1.

Phototropy of the coating: Initial transmittancy 80%; saturation transmission after 15 minutes of actinic radiation 48%; half-value regeneration time 4 minutes.

EXAMPLE 21

29.27 wt-% $CuCl_2$
70.73 wt-% AgBr

Melting conditions: 675°C; 1 min; ceramic crucible, electric furnace, normal atmosphere.

Vaporizing conditions: $4 \times 10^{-5}$ Torr A; 20 g of substance; 40 cm distance; plastic substrate (transparent) polymethyl methacrylate.

Phototropy of the coating: Initial transmittancy 70%; saturation transmission after 15 min of actinic radiation 18%; regeneration half-value time 120 min.

It has been found that a mixture of the individual components that has not been previously melted down to a homogeneous melt breaks down into fractions in the vaporization and does not produce such good results.

ADDITIVES

The coatings vapor-deposited on a substrate may also be overcoated with Schott's vapor-coating glass, with $SiO_2$, magnesium fluoride or thorium fluoride to improve scratch resistance. This additional step of applying an overcoating, can be performed in known ways. In general, it does not improve the phototropy of the object of the invention.

It has been found that other compounds may be added to the coating material of the invention for the purpose of improving its characteristics such as scratch resistance; however, the additional compounds should remain insofar as possible below 35% by weight in order to achieve sufficient phototropy. For example ions, e.g., compounds of the elements Zr, Si, Mg, Al and/or La, may easily be added to the mixture in conjunction with the anions of the invention prior to the initial melting process, in amount of 35 wt.% over and above the 100 weight-percent of the basic composition of the invention. The phototropy, however, is diminished, usually at least in proportion to the given amount of additives.

As an example of such additives, magnesium ions are added in Example 22 in conjection with the anion of the invention, setting out from the composition of Example 19.

EXAMPLE 22

65.48 wt-% AgBr
34.52 wt-% CuBr
100.00 weight parts
12.00 weight parts of $MgBr_2$ Melting conditions: 880°C; 60 sec; quartz crucible; gas furnace, normal atmosphere.

Vaporizing conditions: $10^{-5}$ Torr; 4 A; 1.0 g of substance; 40 cm distance; substrate plastic.

Phototropy of the coating: Initial transmittancy 65%; saturation transmission after 15 min of actinic irradiation 19%; half-value time for regeneration: 200 minutes.

SPECTRAL SENSITIVITY

It has furthermore been found that additives known from the photochemical art for shifting the spectral sensitivity, such as S or Te, have the same or a similar effect, when they are used in the coatings of the invention, as they do in the photochemical art. The additives can be used as chlorides or bromides, added to the melt in conventional amounts, e.g. up to about 35 wt. %.

REGENERATION: SATURATION TRANSMISSION

Figure 2:
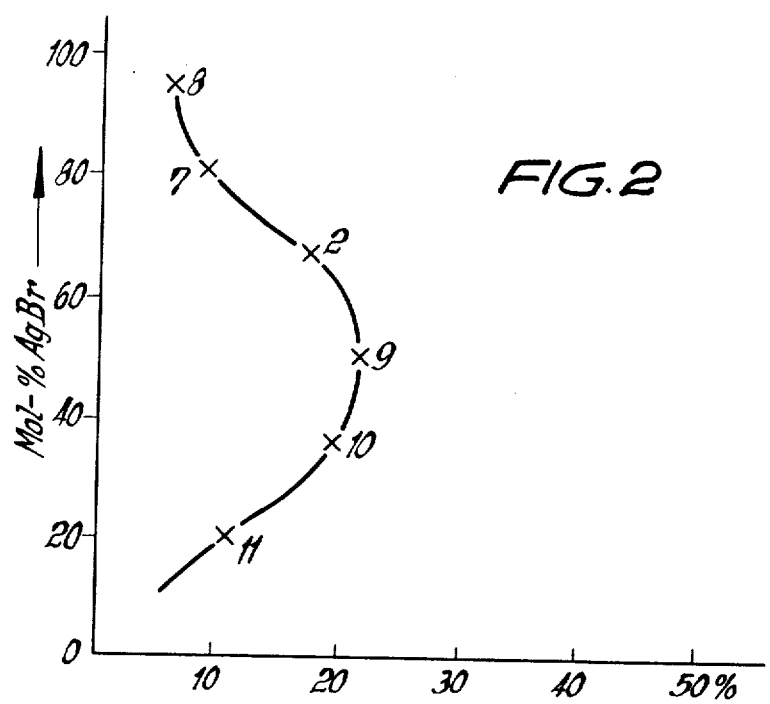
FIG. 2 is a regeneration time graph for the indicated compositions of FIG. 1.
Figure 3:
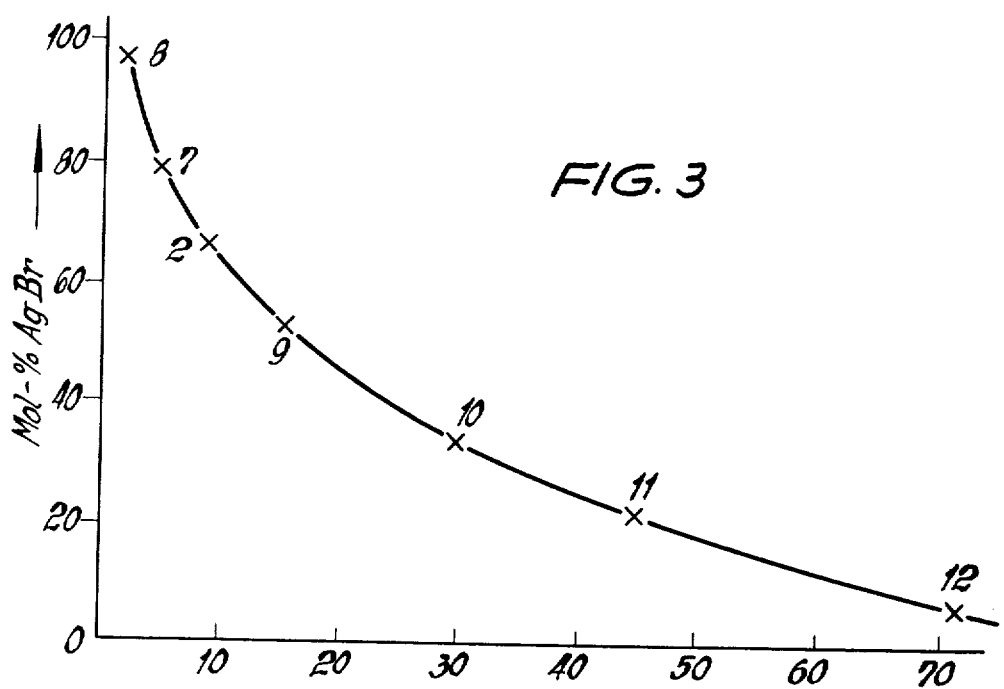
FIG. 3 is a transmission graph for the indicated compositions of FIG. 1.

Studies of the phototropy, e.g., in the CuBr—AgBr section of the three-substance system Cu—Ag—Br, have determined the regeneration speeds (increase in transmission in percent after 10 minutes of standing without optical excitation) shown in FIG. 2. FIG. 3 shows the transmission values in percent (saturation transmission in percent) in relation to the AgBr content in mole-% for the examples in the AgBr—CuBr section in the Cu—Ag—Br three substance system, after an illumination time of 15 minutes under standard conditions from a 150-watt XBO xenon lamp (distance from specimen 25 cm).

EUTECTIC MIXTURES

It has been found that the eutectic mixture range of the AgBr—CuBr two-substante solid material system (W. Jost and S. von Salmuth (Z. phys. Chem. Neue Folge, Vol. 16 (1958) pp. 277–280) between 50 mole-% and 70 mole-% AgBr, provide very good phototropic properties when such materials are applied to substrates according to the invention.

The "Schott" glasses referred to herein are glasses of the assignee hereof.

What is claimed is:

1. An article comprising a substrate forming a body portion of the article and a reversible phototropic coating on the substrate, the coating comprising a fused glassy or crystalline composition of the system silver cations, at least one of chlorine and bromine anions, copper cations, the proportion of the components of said system referred to a batch of compounds of silver and the anion and of copper and the anion melted to produce a fused material for application as the coating, being about 5–58 mole % silver cations, about 8–85 mole % of said anions, and about 2–60 mole % of copper cations.

2. Article according to claim 1, said anions being bromine anions in amount of about 15–80 mole %.

3. Article according to claim 1, said system being $Ag^+$, $Br^-$, $Cu^+$, the proportion of the components of the systems being such that the composition is within the eutectic mixture of the two substance system Ag-Br—CuBr.

4. Article according to claim 1, containing at least one of sulfur and tellurium as an agent for shifting the spectral sensitivity of the phototropic coating.

5. Article according to claim 1, containing at least one of Zr, Si, Mg, Al, and La.

6. Article according to claim 1, containing at least one of Zr, Si, Mg, Al and La in an amount effective to improve the scratch resistance of the photoropic coating thereon.

7. Method of producing article according to claim 1, which comprises depositing said coating on the substrate by vacuum vapor deposition.

8. Solid, glassy or crystalline composition which when applied as a coating to a substrate has reversible phototropic properties, comprising a fused composition of the system silver cations, at least one of chlorine and bromine anions, copper cations, the proportion of the components of said system referred to a batch of compounds of silver and the anion and of copper and the anion melted to produce a fused material for application as the coating, being about 5–58 mole % silver cations, about 8–85 mole % of said anions, and about 2–60 mole % of copper cations.

9. Article according to claim 1, the substrate being glass or plastic.

10. Article according to claim 9, the substrate being translucent.

11. Article according to claim 9, the substrate being transparent.

12. Article according to claim 1, said proportions being 12–55 mole % silver, 30–70 mole % of anion, and 2–55 mole % of Cu.

13. Article according to claim 1, said system being $Ag^+$, $Br^-$, $Cu^+$.

* * * * *